(12) United States Patent
Hokkirigawa et al.

(10) Patent No.: US 6,855,279 B2
(45) Date of Patent: Feb. 15, 2005

(54) WEATHER-RESISTANT EXTERIOR BUILDING MATERIAL

(75) Inventors: Kazuo Hokkirigawa, Yonezawa (JP); Rikuro Obara, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/125,798

(22) Filed: Apr. 18, 2002

(65) Prior Publication Data

US 2002/0152694 A1 Oct. 24, 2002

(30) Foreign Application Priority Data

Apr. 19, 2001 (JP) .................................... 2001-121600

(51) Int. Cl.$^7$ ............................................. C01B 31/02
(52) U.S. Cl. .................... 264/29.1; 264/29.3; 264/29.6; 446/106
(58) Field of Search .................... 264/29.1; 52/233; 446/106

(56) References Cited

U.S. PATENT DOCUMENTS

| 5,195,843 A | 3/1993 | George et al. |
| 5,916,499 A | 6/1999 | Murayama et al. |

FOREIGN PATENT DOCUMENTS

| EP | 516 294 | 12/1992 |
| EP | 0 516 294 | 12/1992 |
| GB | 789 878 | 1/1958 |
| GB | 2 084 212 | 4/1982 |
| JP | 622 8576 | 8/1994 |
| JP | 06-228576 | 8/1994 |
| JP | 10251623 | 9/1998 |
| JP | 10-251623 | 9/1998 |

OTHER PUBLICATIONS

"New Building Materials & Techniques for Rural Housing", Dinesh Mohan and Mohan Rai, *Housing Science*, vol. 1, 1978, pp. 381–393.

"New Building Materials & Techniques for Rural Housing", Dinesh Mohan and Mohan Rai, *Housing Science* vol. 1, pp 381–393, 1978. (13 sheets).

Article: *Development of Hard and Porous Carbon Material "RB Ceramics" Using Rice Bran as a Starting Material*; (Translation from "Zairyou Kagaku", vol. 17, No. 6, pp. 24 to 27, May 1997) ; Kazuo Hokkirigawa; 10 pages.

*Primary Examiner*—Carl D. Friedman
*Assistant Examiner*—Nahid Amiri
(74) *Attorney, Agent, or Firm*—Flynn, Thiel, Boutell & Tanis, P.C.

(57) ABSTRACT

The invention provides a weather-resistant exterior building material which has been unavailable in the past with respect to characteristics of keeping harmful insects such as white ants, and so forth away therefrom, light weight, a long service life, insusceptibility to variation in temperature, hygroscopicity, and easiness in fabrication, and an exterior article made up of the same. The weather-resistant exterior building material according to the invention makes use of a compact formed of RB ceramic, CRB ceramic, or fire-resistant CRB ceramic.

5 Claims, 3 Drawing Sheets

WEATHER-RESISTANT EXTERIOR BUILDING MATERIAL

BACKGROUND OF THE INVENTION

1. Field of the Invention

The invention relates to a weather-resistant exterior building material made of a novel constituent material, and an exterior article making use of the same.

2. Description of the Related Art

Most conventional building materials used in exterior articles are wood, and painting and the like are generally applied thereto because they get wet in the rain. However, there has been involved a risk of breakage and so forth occurring thereto because they become brittle after they get rotten and undergo deformation, and so forth, due to their inability to withstand usage over many years. There has also been the need for providing touch-up painting because of deterioration in the external appearance thereof due to cracking and peel-off occurring to outer faces thereof. Further, there have been problems with them in that they become slippery and dangerous to handle when wetted in the rain, and become difficult to handle because water drops on the outer faces continue to stay thereon without being absorbed or evaporated.

Also, there have been cases where an open veranda and a veranda are built with concrete or the like, however, these have had drawbacks rendering them unpopular, such as slipperiness due to lack of absorbability, and very heavy weight thereof.

It is therefore an object of the invention to solve some of the drawbacks of the conventional building materials as described above, and to provide a weather-resistant building material which has been unavailable in the past when light weight, weather resistance, corrosion resistance, characteristics of keeping away harmful insects such as white ants, insusceptibility to variation in temperature, hygroscopicity, and easiness in fabrication are taken into account, and an exterior article making use of the same.

The weather-resistant building material and the exterior article made up of the same make use of RB ceramic, CRB ceramic or fire-resistant CRB ceramic. The RB ceramic, the CRB ceramic or the fire-resistant CRB ceramic is a constituent material produced by the following method.

An attempt to obtain a carbonaceous material by utilizing rice bran, produced in a quantity of 900,000 tons a year in Japan and in a quantity of as much as 33 million tons a year throughout the world, has been well known by researches carried out by Mr. Kazuo Hokkirigawa, the first inventor of the invention (refer to "Functional Material", May issue, 1997, Vol. 17, No. 5, pp. 24~28).

In this literature reference is made to a carbon material (hereinafter referred to as the RB ceramic) and the preparation thereof, in which the material is obtained by mixing and kneading defatted bran derived from rice bran and the thermosetting resin together followed by drying a compact obtained by pressure forming and subsequently, baking the dried compact in an atmosphere of an inert gas.

With such a method of forming the RB ceramic as described above, however, it has been practically difficult to form the compact with high precision because there occurs a discrepancy in dimensions by as much as 25% in terms of a contraction ratio of the dimensions of the compact obtained by pressure forming to those of a finished compact obtained after baking the former in the inert gas. However, another ceramic (the CRB ceramic) representing an improvement on the RB ceramic has since been developed.

The CRB ceramic used in the invention is an improved material of the RB ceramic that is obtained from defatted bran derived from rice bran, and a thermosetting resin. More particularly, the defatted bran derived from rice bran and a thermosetting resin are mixed and kneaded and subjected to a primary baking in an inert gas at a temperature in a range of 700 to 1000° C., and pulverizing the kneaded mixture after the primary baking into carbonized powders passing through a sieve of 60 mesh or below. The carbonized powder and the thermosetting resin are further mixed and kneaded, and pressure formed at a pressure in a range of 20 to 30 MPa, subjecting the compact again to a heat treatment in an inert gas atmosphere at a temperature in a range of 100 to 1100° C. The CRB ceramic differs largely from the RB ceramic in that, in contrast with the RB ceramic having the contraction ratio of the dimensions of the compact obtained by pressure forming to those of the finished compact at as high as 25%, the CRB ceramic is superior to the RB ceramic in respect of the contraction ratio at not more than 3%, which is very low.

Further, with the invention, use can be made of material obtained by replacing part of the carbonized powders of the CRB ceramic with ceramic powders before subjecting the same to a secondary heat treatment. Such material utilizing the ceramic powders in combination with the CRB ceramic is referred to as the fire-resistant CRB ceramic.

The ceramic powders are composed of any selected from the group consisting of $SiO_2$, $Si_3N_4$, $ZrO_2$, $Al_2O_3$, SiC, BN, WC, TiC, Sialon (Si—Al—O—N based compound solid solution), porcelain clay, feldspathic clay, kaolin, and so forth.

With the invention, use can be made of one kind of, or not less than two kinds of the ceramic powders described above, and a blending ratio thereof at 30 to 100 by weight to the carbonized powders at 100 is adequate.

SUMMARY OF THE INVENTION

With the invention, weather-resistant, light, hard, and strong RB ceramic, CRB ceramic, or fire-resistant CRB ceramic is used for an exterior building material. These materials are ceramic materials friendly to nature, having the following excellent characteristics. The RB ceramic, the CRB ceramic, or the fire-resistant CRB ceramic generally has the following properties:

- higher hardness
- smaller expansion coefficient
- good electrical conductivity
- small specific gravity and light weight
- excellent abrasion resistance
- easy to form and easy to produce in a die
- ceramic materials having varying characteristics can be produced by blending with various kinds of resins
- the materials being made of rice bran, they have little adverse effect on global environment, leading to conservation of natural resources.

Accordingly, it can be said that these ceramic materials have conditions suitable, particularly, for application to building, such as weather-resistance, light weight, excellent abrasion-resistance, insusceptibility to damage, long service life, and so forth.

In particular, a CRB ceramic subjected to a secondary heat treatment at a temperature not lower than 600° C. has superior property as the exterior building material because the same has very high hardness, porosity, and good permeability, and is light and strong because of low specific gravity.

The inventor has discovered that structures having a variety of characteristics can be easily fabricated by use of the CRB ceramic or the fire-resistant CRB ceramic as the exterior building material. In another embodiment of the invention, wherein the RB ceramic used in the past is adopted, a contraction ratio of the dimensions of a compact as formed to those of a finished compact is as high as 25%, however, since a compact preformed of the RB ceramic can be adjusted in dimensions by grinding the same, the embodiment of the invention, carried out by use of the RB ceramic, is not to be excluded from the scope of the invention. The RB ceramic, the CRB ceramic or the fire-resistant CRB ceramic has substantially the same properties except for the dimensions of the finished compact, and for this reason as well, the invention does not exclude the embodiment wherein the RB ceramic is used.

With the invention, however, it is preferable to primarily use the CRB ceramic or the fire-resistant CRB because, in such a case, a compact with high precision in dimensions can be obtained through one forming operation.

Further, it has been discovered that structures having a variety of characteristics can be fabricated by combining the exterior building material according to the invention with a building material made of a conventional synthetic resin or a steel based metal as appropriate, and by introducing a design idea to shapes of contact parts within the structures.

That is, the invention provides the building material having excellent weather resistance, wherein the whole or at least part thereof is formed of the RB ceramic, the CRB ceramic or the fire-resistant CRB ceramic. Furthermore, with a do-it-yourself kit prepared by preforming such ceramic materials as described into compacts, an open veranda, a veranda, and so forth can be fabricated even by an amateur carpenter at home with ease.

DESCRIPTION OF THE PREFERRED EMBODIMENTS

Figure 1:
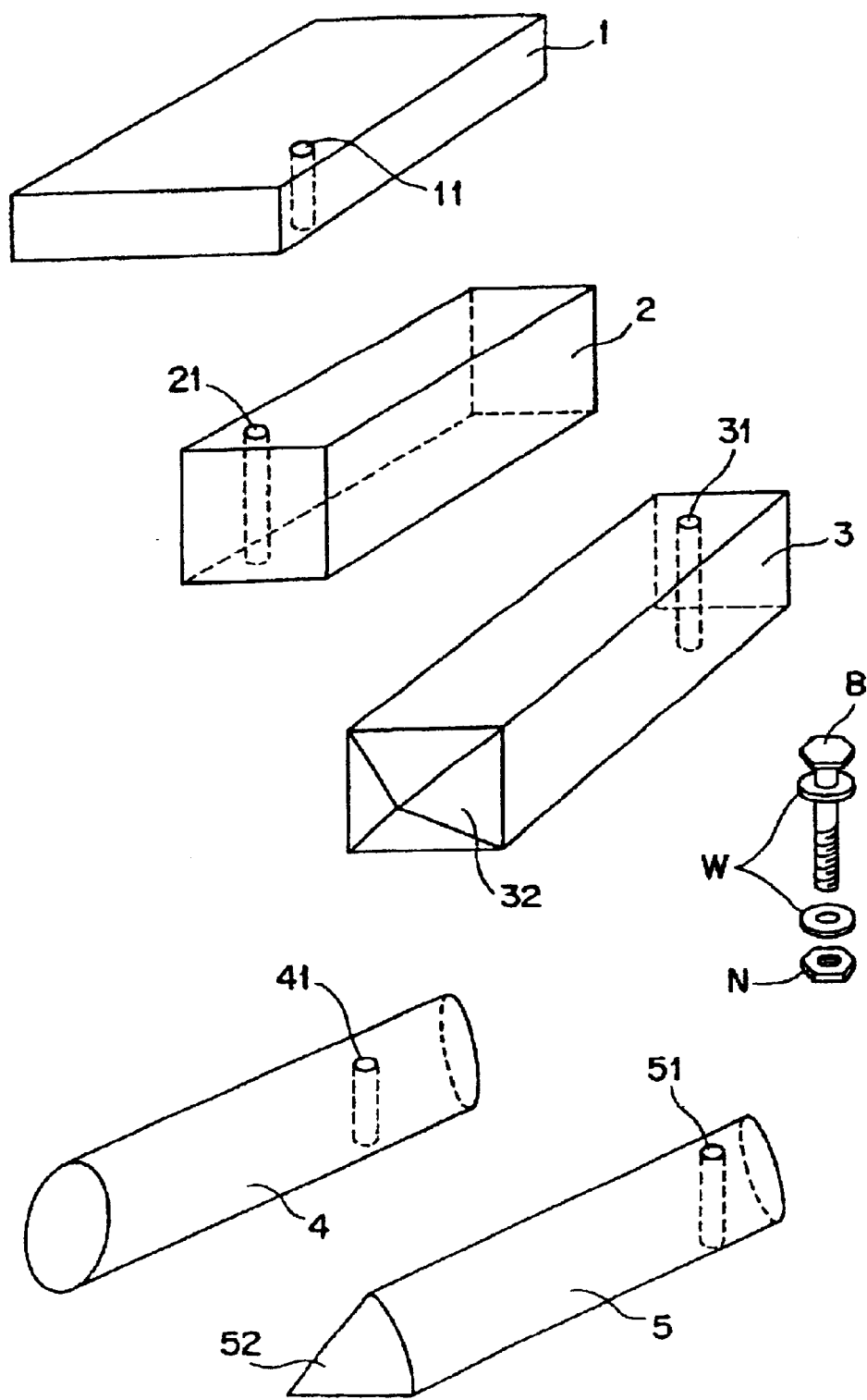
FIG. 1 is a perspective view of compacts according to the invention.

RB ceramic, CRB ceramic, or fire-resistant CRB ceramic material for use in a building material according to the invention is made of defatted bran derived from rice bran, as a main raw material, together with a thermosetting resin.

The defatted bran may be of either a domestic origin or a foreign origin regardless of the kind of rice.

Further, for the thermosetting resin, any thermosetting resin may be used as long as it has a thermosetting property, and typical examples thereof include a phenol resin, diaryl phthalate resin, unsaturated polyester resin, epoxy resin, polyimide resin, and triazine resin. In particular, a phenol resin is preferably used.

Furthermore, a thermoplastic resin, such as a polyamide and so forth, can be used in combination with the resin provided that it is used without departing from the spirit and scope of the invention.

A mixing ratio of the defatted bran to the thermosetting resin is 50 to 90:50 to 10 by weight, however, the mixing ratio of 70 to 80:30 to 20 is preferably adopted.

Next, a method of producing the CRB ceramic material is briefly described hereinafter. The method comprises the steps of mixing and kneading defatted bran derived from rice bran with a thermosetting resin, subjecting a kneaded mixture thus obtained to a primary baking in an inert gas at a temperature in a range of 700 to 1000° C., pulverizing the kneaded mixture after the primary baking into carbonized powders, mixing and kneading the carbonized powders with a thermosetting resin, pressure forming a kneaded mixture thus obtained into a compact at a pressure in a range of 20 to 30 MPa, and subjecting the compact again to a heat treatment at a temperature in a range of 100 to 1100° C. in an inert gas atmosphere.

A thermosetting resin in a liquid state, having a relatively small molecular weight, is desirable as the thermosetting resin for use in the primary baking.

A rotary kiln is normally used in carrying out the primary baking, and baking time is in a range of 40 to 120 min. A mixing ratio of the carbonized powders obtained by the primary baking to the thermosetting resin is 50 to 90:50 to 10 by weight, however, the mixing ratio of 70 to 80:30 to 20 is preferably adopted.

The kneaded mixture of the carbonized powders and the thermosetting resin is pressure formed into the compact at a pressure in a range of 20 to 30 MPa, preferably, in a range of 21 to 25 MPa. A die for use is preferably at a temperature of about 150° C.

For the heat treatment, a well controlled electric furnace is normally employed, and heat treatment time is in a range of about 60 to 360 min.

A heat treatment temperature is preferably in a range of 100 to 1100° C., and a warming rate up to the heat treatment temperature is required to be relatively moderate up to 500° C. In terms of more specific values, the warming rate is in a range of 0.5 to 2° C./min, and is preferably about 1° C./min.

Further, in lowering the temperature of the compact after being baked by the heat treatment, a cooling rate is required to be relatively moderate until reaching 500° C. Upon the temperature dropping below 500° C., the compact is left to cool by itself. In terms of more specific values, the cooling rate is in a range of 0.5 to 4° C./min, and is preferably about 1° C./min. Further, wood and synthetic resin, in common use as conventional building materials, can be combined with the RB ceramic or CRB ceramic material as appropriate.

For the synthetic resin, use may be made of any synthetic resin selected from the group consisting of a phenol resin, vinyl chloride resin, polyurethane, polyolefin, polyamide, polyacetal, vinylon, soft or hard synthetic rubber, and so forth.

A weather-resistant exterior building material according to the invention is basically light in weight, hard, and strong, having further corrosion-resistance, and characteristics of keeping away harmful insects such as white ants, and so forth.

As shown in FIG. 1, the weather-resistant exterior building material according to the invention can be formed into a compact in various shapes such as a plate 1 in a standardized size, a square bar 2, a square bar 3 with a square pyramid 32 formed on one side, a cylinder 4, a cylinder 5 with a cone 52 formed on one side, and so forth. Further, it is possible to define through holes 11, 21, 31, 41, and 51 for allowing a nail, bolt, line, and rope to pass therethrough, respectively, at the time of forming these compacts. The through holes may be of any shape in section among a circle, square, and so forth, however, consideration needs to be given to the size and location of the respective through holes so as not to impair the external appearance of the compacts.

When tightening up the compacts formed of the CRB ceramic with a nut N and a bolt B, a washer W is preferably inserted between the bolt B and the compact formed of the CRB ceramic as well as between the nut N and the compact formed of the CRB so as not to allow pressure to bear down directly on the CRB ceramic. Since there is a tendency that the compact formed of the CRB, in particular, to which the secondary heat treatment is applied at a temperature not lower than 600° C. has deteriorating impact resistance although it is hard in quality, care is needed not to tighten up the bolt B excessively with the nut N.

Figure 2:
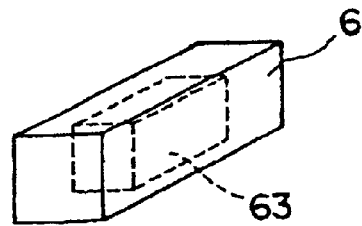
FIG. 2 is a perspective view of compacts with a hollow space defined inside thereof, respectively, according to the invention.
Figure 2:
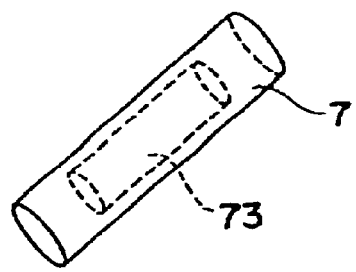

Further, as shown in FIG. 2, a square bar 6 and a cylinder 7 can be formed so as to have a hollow space defined inside thereof, respectively. By so doing, it is possible not only to save on the RB ceramic and the CRB ceramic but also to reduce the weight of the respective compacts in whole, thereby enhancing easiness in handling. The weather-resistant exterior building material according to the invention is applicable to any exterior articles, and can be effectively used for an open veranda, a veranda, an outside wall, a storm door box, an eaves trough, stepping-stones, hedge stanchions, and so forth. The weather-resistant exterior building material according to the invention is black in color after formed into the compacts, but can be colored by applying a paint thereto. Use of paints for outdoor use, available in the market, is preferable.

Now, embodiments of the invention are summed up as follows:

(1) A weather-resistant exterior building material making use of a compact formed of RB ceramic, CRB ceramic, or fire-resistant CRB ceramic.

(2) A weather-resistant exterior building material according to item (1) above, wherein the compact is any one selected from the group consisting of a plate, a square bar, a square bar with a square pyramid formed on one side thereof, a cylinder, and a cylinder with a cone formed on one side thereof.

(3) A weather-resistant exterior building material according to item (2) above, wherein the compact is provided with a nail hole or bolt hole, defined therein.

(4) A weather-resistant exterior building material according to item (3) above, wherein painting is applied to outer faces of the compact.

(5) An exterior article made up of the weather-resistant exterior building material according to any one of items (1) to (4) above.

(6) An exterior article according to item (5) above, wherein the exterior article is any one selected from the group consisting of an open veranda, a veranda, an outside wall, a storm door box, an eaves trough, a stepping-stone, and a hedge stanchion.

(7) An open veranda kit comprising a block formed of RB ceramic, CRB ceramic, or fire-resistant CRB ceramic, and a plurality of square bars according to item (2) above, wherein an open veranda is assembled by tightening up the block having preformed grooves for fitting onto the plurality of the square bars, and bolt holes defined in the respective grooves, and the plurality of the square bars each having preformed bolt holes with bolts and nuts.

Examples of structures to which the invention is applied are described hereinafter.

EXAMPLE 1

FIG. 1 shows an example of a square bar according to the invention, applied to an open veranda.

A building material made of CRB ceramic is formed as follows:
(Production of CRB Ceramic)

75 kg of defatted bran derived from rice bran was mixed and kneaded with 25 kg of phenol resin (resol) in liquid state while heating both to 50 to 60° C. A plastic homogeneous mixture was obtained.

The mixture was subjected to a primary baking at 900° C. in a nitrogen atmosphere in a rotary kiln for 60 minutes. Subsequently, a baked product obtained was screened through a 100-mesh sieve, thereby obtaining carbonized powders 50 to 250 $\mu$m in particle diameter.

75 kg of the carbonized powders thus obtained was mixed and kneaded with 25 kg of phenol resin (resol) in solid state while heating both to 100 to 150° C. A plastic homogeneous mixture was obtained.
(Formation of Square Bars)

Subsequently, the plastic homogeneous mixture was pressure formed at a pressure of 22 MPa into compacts 2, each in the shape of the square bar provided with a nail hole 21, shown in FIG. 1. A die used was at a temperature of 150° C.

The compacts 2 were each taken out of the die, heated in a nitrogen atmosphere up to 500° C. at a warming rate of 1° C./min, held at 500° C. for 60 min, and heat treated at 700° C. for 120 min.

Subsequently, the temperature of the compacts was lowered at a cooling rate of 2 to 3° C./min until reaching 500° C., and upon the temperature dropping below 500° C., the compacts were left to cool by themselves.
(Formation of an Open Veranda)

Figure 3:
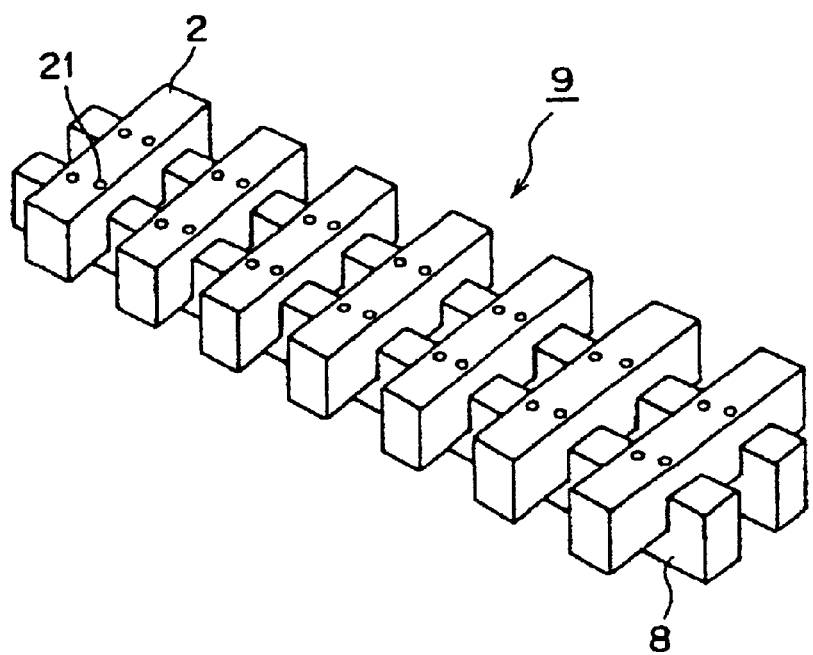
FIG. 3 is a perspective view of an open veranda made up of the compacts according to the invention.

As shown in FIG. 3, the compacts 2 in the shape of the square bar were arranged on top of wooden blocks 8, each made of natural wood, and a nail was inserted into respective nail holes 21 to be driven thereinto with a hammer, thereby securely attaching the compacts 2 to the wooden blocks 8.

An open veranda 9 shown in FIG. 3 has the following features:

light weight and excellent workability excellent permeability owing to porosity excellent weather resistance and corrosion resistance characteristics of keeping white ants away therefrom

EXAMPLE 2

(Production of CRB Ceramic)

75 kg of defatted bran derived from rice bran was mixed and kneaded with 25 kg of phenol resin (resol) in liquid state while heating both to 50 to 60° C. A plastic homogeneous mixture was obtained.

The mixture was subjected to a primary baking at 900° C. in a nitrogen atmosphere in a rotary kiln for 60 minutes. Subsequently, a baked product obtained was screened through a 100-mesh sieve, thereby obtaining carbonized powders 50 to 250 $\mu$m in particle diameter.

75 kg of the carbonized powders thus obtained was mixed and kneaded with 25 kg of phenol resin (resol) in solid state while heating both to 100 to 150° C. A plastic homogeneous mixture was obtained.

(Formation of Cylinders with a Cone Formed on One Side Thereof)

Figure 4:
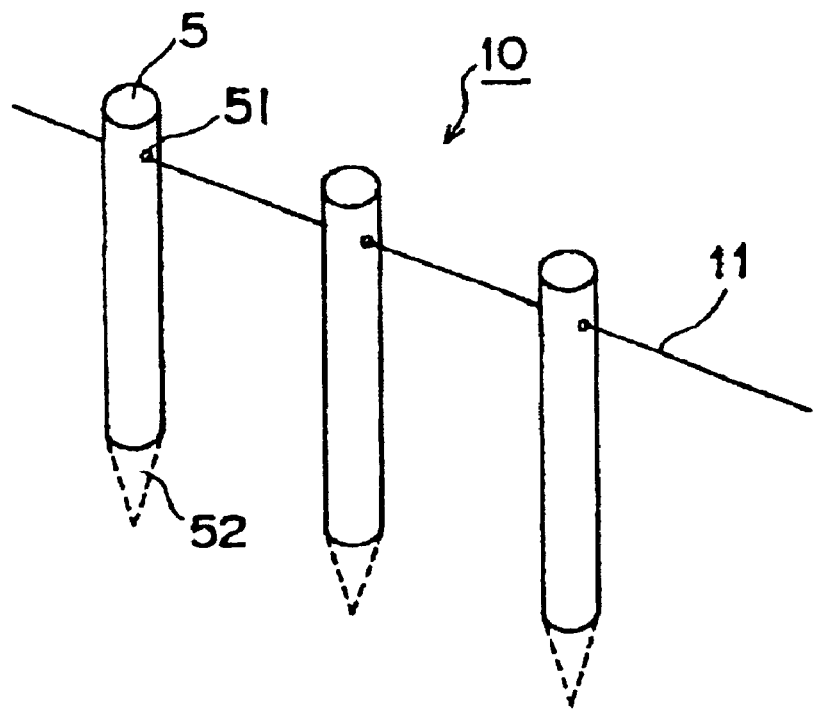
FIG. 4 is a perspective view of hedge stanchions built by the compacts according to the invention.

Subsequently, the plastic homogeneous mixture was pressure formed at a pressure of 22 MPa into compacts 5, each in the shape of the cylinder with the cone formed on one side thereof, having a through hole 51 defined therein, as shown in FIG. 4. A die used was at a temperature of 150° C.

The compacts 5 were each taken out of the die, heated in a nitrogen atmosphere up to 200° C. at a warming rate of 1° C./min, and heat treated at 200° C. for 120 min. Subsequently, the compacts were obtained by leaving the same to cool by themselves.

(Formation of Hedge Stanchions)

The compacts 5 thus obtained were arranged at a given interval, and were driven into the ground by tapping the heads thereof with a hammer. Subsequently, the through holes 51 were threaded with a rope 11, thereby building hedge stanchions.

The hedge stanchions 10 shown in FIG. 4 have the following features:

The CRB ceramic itself has a specific gravity greater than that for Example 1, but has an impact resistance sufficient to withstand shocks received when the hedge stanchions 10 were driven into the ground by tapping the heads thereof with a hammer.

excellent weather resistance and corrosion resistance characteristics of keeping white ants away therefrom.

EXAMPLE 3

There is shown hereinafter an example of forming an open veranda 12 using the square bar 6 with the hollow space formed inside thereof, shown in FIG. 2.

(Production of Fire-Resistant CRB Ceramic)

75 kg of defatted bran derived from rice bran was mixed and kneaded with 25 kg of phenol resin (resol) in liquid state while heating both to 50 to 60° C. A plastic homogeneous mixture was obtained.

The mixture was baked at 900° C. in a nitrogen atmosphere in a rotary kiln for 60 minutes. Subsequently, a baked product obtained was pulverized with the use of a crusher and screened through a 200-mesh sieve, thereby obtaining carbonized powders 90 μm in average particle diameter.

Then, 80 kg of the carbonized powders thus obtained, 60 kg of alumina powders, 10 kg of aluminum phosphate as a binder, and 25 kg of water as a solvent were mixed and kneaded with each other. A plastic homogeneous mixture was obtained.

Use was made of alumina powders 10 to 20 μm in average particle diameter.

(Formation of Compacts)

The plastic mixture of fire-resistant CRB ceramic thus obtained was pressure formed at a pressure of 40 MPa into compacts, each in the shape of a square bar 6 with a hollow space 63 formed inside thereof, as shown in FIG. 2, and a compact in the shape of a block 13 provided with grooves 14, each having a width substantially identical to the width of the square bar 6, respectively. Dies used were at a temperature of 150° C.

The compacts were each taken out of the respective dies, heated in a nitrogen atmosphere up to 500° C. at a warming rate of 2° C./min, held at 500° C. for 60 min, and sintered at 1100° C. for 100 to 130 min.

Subsequently, the temperature of the compacts was lowered at a cooling rate of 2° C./min until reaching 500° C., and upon the temperature dropping below 500° C., the compacts 6 and the compact 13 shown in FIG. 5 were obtained by leaving the same to cool by themselves.

Figure 5:
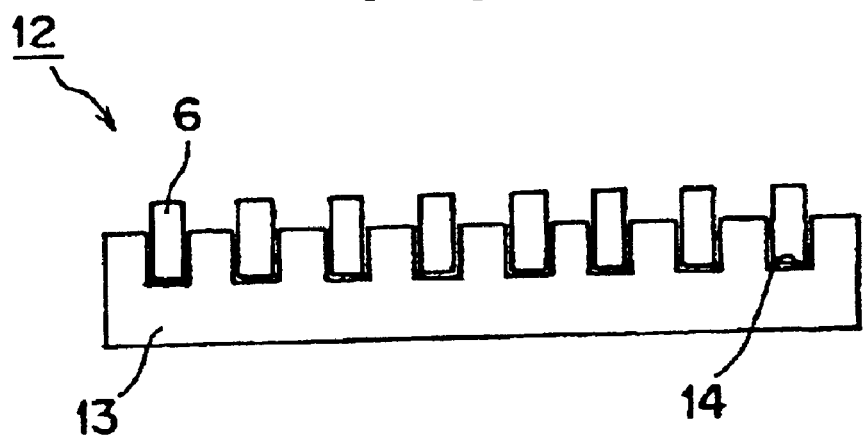
FIG. 5 is a perspective view of an open veranda making use of the compacts with the hollow space defined inside thereof, according to the invention.

The compact 6 in the shape of the square bar was embedded in the respective grooves 14 of the compact 13 in the shape of the block by tapping the head of the compact 6 with a wooden hammer, thereby fabricating an open veranda 12 shown in FIG. 5.

The open veranda 12 has the following features:

light weight due to its hollow structure, and excellent workability excellent weather resistance and corrosion resistance no cracking occurring to the compacts even by driving the square bar into the respective grooves by tapping the head of he square bar with the wooden hammer characteristics of keeping white ants away therefrom.

EXAMPLE 4

An example of fabricating an open veranda by use of square bars and a block, formed of CRB ceramic (Production of CRB Ceramic)

75 kg of defatted bran derived from rice bran was mixed and kneaded with 25 kg of phenol resin (resol) in liquid state while heating both to 50 to 60° C. A plastic homogeneous mixture was obtained.

The mixture was subjected to a primary baking at 900° C. in a nitrogen atmosphere in a rotary kiln for 60 minutes. Subsequently, a baked product obtained was screened through a 100-mesh sieve, thereby obtaining carbonized powders 50 to 250 μm in particle diameter.

75 kg of the carbonized powders thus obtained was mixed and kneaded with 25 kg of phenol resin (resol) in solid state while heating both to 100 to 150° C. A plastic homogeneous mixture was obtained.

(Formation of Square Bars and a Block)

Subsequently, the plastic mixture was pressure formed at a pressure of 22 MPa into compacts (not shown), each in the shape of a square bar, and a compact (not shown) in the shape of a block provided with grooves for fitting onto the respective square bars, each having bolt holes defined therein, respectively. Dies used were at a temperature of 150° C.

The compacts were each taken out of the respective dies, heated in a nitrogen atmosphere up to 500° C. at a warming rate of 1° C./min, held at 500° C. for 60 min, and heat treated at 600° C. for 120 min.

Subsequently, the temperature of the compacts was lowered at a cooling rate of 2 to 3° C./min until reaching 500° C., and upon the temperature dropping below 500° C., the compacts were left to cool by themselves.

(Formation of an Open Veranda)

The compact in the shape of the square bar was placed in the respective grooves of the compact in the shape of the block for fitting onto the respective square bars, bolt holes of the respective square bars were aligned with the bolt holes provided in the respective grooves of the block, and the respective square bars were securely attached to the block by tightening up a bolt inserted in the respective bolt holes with a nut with a washer interposed therebetween, thereby fabricating an open veranda.

The open veranda obtained has the following features:

light weight and excellent workability excellent permeability owing to porosity excellent weather resistance and corrosion resistance It can be fabricated even by an amateur carpenter with a do-it-yourself kit.

characteristics of keeping white ants away therefrom

It has been confirmed that the exterior building material, made of the RB ceramic, the CRB ceramic or the fire-resistant CRB ceramic, according to the invention, is light in weight, has weather resistance, corrosion resistance, and the characteristics of keeping harmful insects such as white ants, and so forth, away therefrom. It has further been confirmed that the CRB ceramic heat-treated at a high temperature is porous and has excellent permeability while the CRB ceramic heat-treated at a low temperature has relatively excellent impact resistance. With a do-it-yourself kit which is prepared by preforming such ceramic material as described into compacts, an open veranda, a veranda, and so forth can be fabricated even by an amateur carpenter at home with ease.

What is claimed is:

1. A weather-resistant exterior building material comprising a compact formed of a fire-resistant CRB ceramic, the fire-resistant CRB ceramic being obtained by mixing and kneading defatted bran derived from rice bran with a thermosetting resin consisting of at least one resin selected from the group consisting of phenolic resins, diaryl phthalate resins, unsaturated polyester resins, epoxy resins, polyamide resins and triazine resins to form a resulting mixture, the mixing ratio by weight between the defatted bran and the thermosetting resin being in the range from 50:90 to 50:10;

primarily baking the resulting mixture in an inert gas at a temperature of from 700 to 1000° C. to form a resulting compact;

pulverizing the resulting compact into carbonized powder;

mixing and kneading the carbonized powder with a ceramic powder, a solvent and a binder to provide a plasticized mixture;

pressure-forming the plasticized mixture at a pressure of 10 MPa to 100 MPa to form a pressure-formed compact;

and heat-treating the pressure-formed compact in an inert gas atmosphere or an atmosphere not containing oxygen at a temperature of from 100 to 1100° C., wherein the ceramic powder is at least one powder selected from the group consisting of $SiO_2$, $Si_3N_4$, $ZrO_2$, $Al_2O_3$, SiC, BN, WC, TiC, sialons, porcelain clay, feldspar clay and kaolin and the blending ratio of ceramic powder to carbonized powder is 30–100 parts by weight based on 100 parts by weight of carbonized powder.

2. A weather-resistant exterior building material comprising a compact formed of an RB ceramic, the RB ceramic being obtained by mixing and kneading defatted bran derived from rice bran and a thermosetting resin consisting of at least one resin selected from the group consisting of phenolic resins, diaryl phthalate resins, unsaturated polyester resins, epoxy resins, polyamide resins and triazine resins to form a resulting mixture, the mixing ratio by weight between the defatted bran and the thermosetting resin being in the range from 50 to 90:50 to 10;

kneading the resulting mixture to form a kneaded mixture;

pressure-forming the kneaded mixture to form a compact;

drying the compact and firing the dried compact at a temperature in a range of 700–1000° C. in an inert gas atmosphere.

3. The weather-resistant exterior building material of claim 2, wherein said mixing ratio is in the range from 70 to 80:30 to 20 parts by weight.

4. A weather-resistant exterior building material comprising a compact formed of a CRB ceramic, the RB ceramic being obtained by mixing and kneading defatted bran derived from rice bran and a thermosetting resin consisting of at least one resin selected from the group consisting of phenolic resins, diaryl phthalate resins, unsaturated polyester resins, epoxy resins, polyamide resins and triazine resins to form a resulting mixture, the mixing ratio by weight between the defatted bran and the thermosetting resin being in the range from 50 to 90:50 to 10;

primarily baking the resulting mixture in an inert gas at a temperature of 700 to 1000° C. to form a resulting compact;

pulverizing the resulting compact into carbonized powders;

mixing the carbonized powders with a thermosetting resin to form a second resulting mixture;

kneading the second resulting mixture;

pressure-forming the kneaded second resulting mixture at a pressure in the range of 20 to 30 MPa to form a workpiece;

and subjecting the formed workpiece to a secondary heat treatment at a temperature in a range of 100 to 1100° C. in an inert gas atmosphere, wherein the mixing ratio of the carbonized powders with the thermosetting resin is 50 to 90:50 to 10 parts by weight.

5. The weather resistant exterior building material of claim 4, wherein the mixing ratio is 70 to 80:30 to 20 parts by weight.

* * * * *